Nov. 29, 1938.   M. PULGAR   2,138,428
MEANS FOR SKIN TREATMENT
Filed Nov. 11, 1936   2 Sheets—Sheet 2
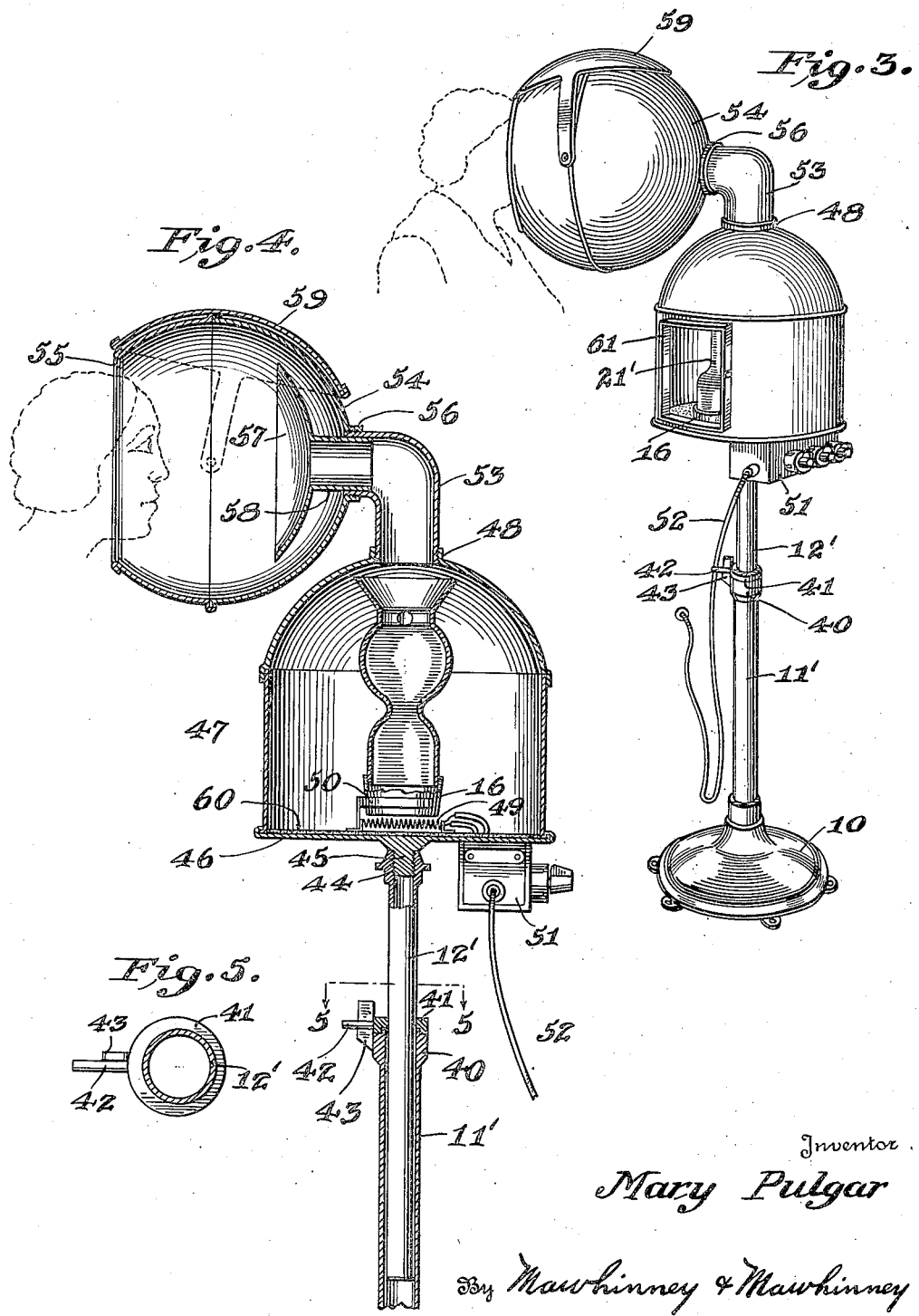
Inventor
Mary Pulgar
By Mawhinney & Mawhinney
Attorneys Patented Nov. 29, 1938

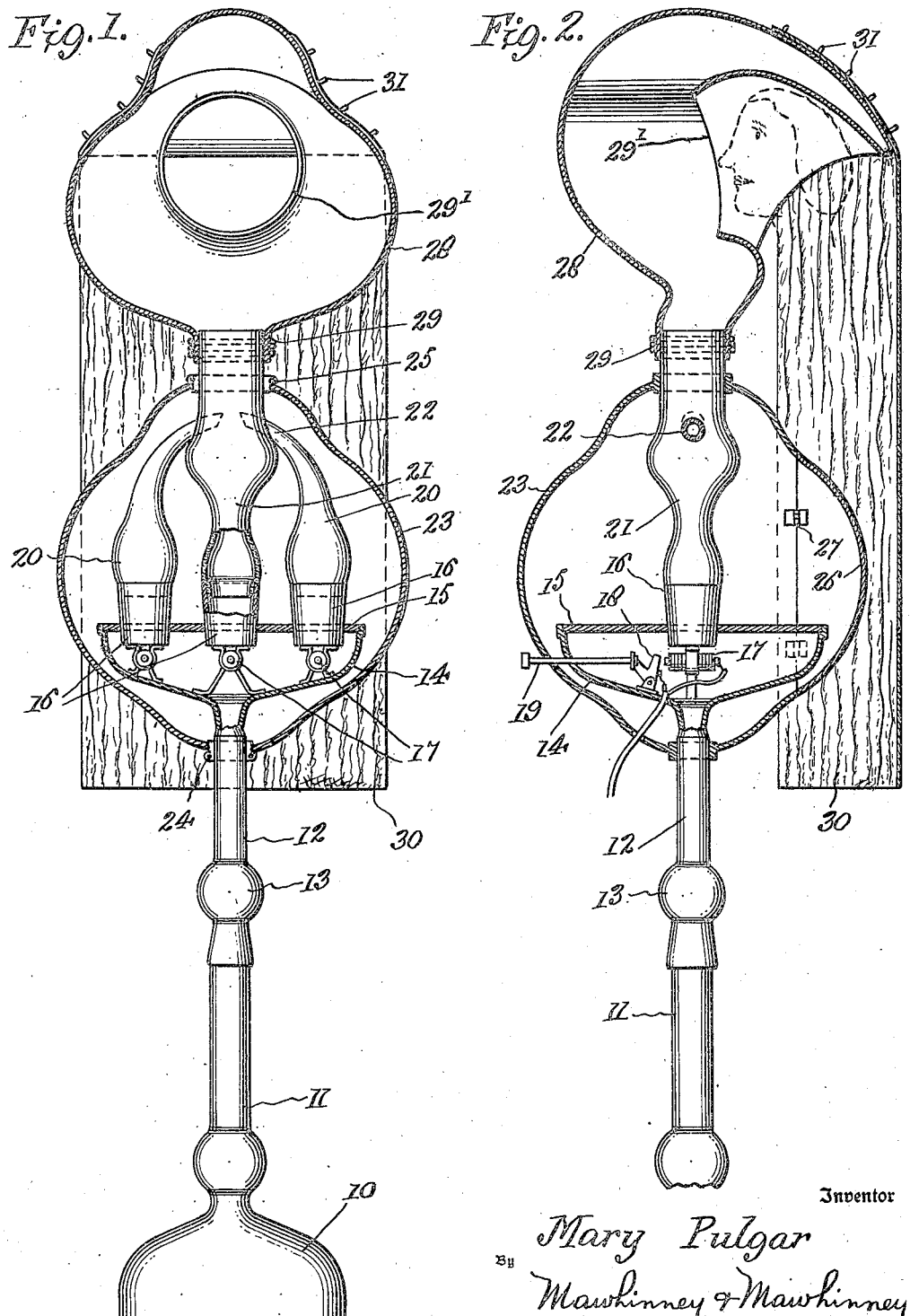

2,138,428

UNITED STATES PATENT OFFICE 2,138,428

MEANS FOR SKIN TREATMENT

Mary Pulgar, New York, N. Y.

Application November 11, 1936, Serial No. 110,341

3 Claims. (Cl. 128—256)

The present invention relates to improvements in a method and means for skin treatment and more particularly to a vapor treatment.

An object of the invention is to provide means to give a treatment for beautifying the skin, for alleviating fatigue and nourishing the facial muscles and skin.

Another object is to provide means to treat the skin by the successive application of various vapors thereto.

Another object is to eliminate handling and massaging of the skin in the treatment.

A further object is to provide a device to contain and selectively vaporize the ingredients used in the treatments and to apply the vapors to the face.

Another object is to provide a device in which the head and face alone may be treated by application of the vapors.

A still further object is the provision of a device which permits the gentle application of the treating vapors.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a front elevation of a device with parts broken away, embodying the features of the invention.

Figure 2 is a side view in vertical section taken through the device of Figure 1.

Figure 3 is a perspective view of a modified form of the device.

Figure 4 is a vertical section taken through the center of the vaporizer and hood, and Figure 5 is a section taken on the line 5—5 of Figure 4.

The device is constructed of a pedestal having a ground engaging portion 10, a shaft 11 extending upwardly therefrom and a second shaft 12 telescoping into shaft 11 and adapted for vertical adjustment thereby. A ball 13 is preferably attached rotatably in the upper shaft 12 so as to provide for swinging the device.

At the upper end of the shaft 12 is located a supporting frame 14 which is joined to the top of the shaft by any suitable means. Across the top of the frame 14 is placed a plate 15 having spaced openings therein to receive the cups or containers 16. Mounted on the frame 14 beneath each of the cups 16 is a heating coil 17 and switch 18. The switch 18 has a handle 19 extending beyond the frame 14 to provide accessible control for the switches.

In the form shown in the drawings the three cups 16 are arranged in a straight line. The two end cups have fitted into each of them a tube 20 of curved shape and preferably of heat resistant glass. The lower ends of the tubes 20 are reduced so as to seat tightly into open tops of the cups 16. The center cup or container 16 is provided with the upwardly extended tube 21 which extends upwardly beyond the ends of the curved tubes 20 and is enlarged at a point opposite these ends. In opposite sides of the tube 21 openings 22 are let to receive the reduced upper ends of the tubes 20. The tube 21 thus forms a common outlet for the three containers.

A casing 23 is secured to the upper shaft 12 by a suitable clamping ring as at 24. The upper end of the casing 23 is provided with a ring 25 which slides on the upper part of the common tube 21. The casing 23 extends completely around the frame 14 and the cup and tube assembly and is provided at one side with a door 26 hinged to the rest of the casing as at 27. The door 26 is preferably symmetrical with the rest of the casing 23. By opening the door 26 an operator may gain access to the tubes 20 and 21 and may remove the same from the cup 16 for the sake of cleaning or replenishing the same. The tubes 20 and 21 may be raised as a unit and the common outlet tube 21 will slide in the ring 25 sufficiently for the purpose of lifting the tubes clear of the cups 16.

Above the open end of the common outlet tube 21 is placed a hood 28 which is tightly attached to the outlet tube 21 by some means such as the binding rings 29. As seen in Figure 2, the hood 28 forms the wall of a caplike structure which has a central hollow portion open for the insertion of the head of a user. In one wall of the hood 28 at a point opposite the face of a user when the head is placed in the hollow portion the non-porous wall is cut away leaving an opening or aperture 29' which furnishes an outlet for the vapors arising from the cups 16. A curtain 30 is draped over the top of the cap formed by the hood in such a manner as to fall about the neck and shoulders of a user when the head is in treating position. The curtain is secured to the hood by means of suitable buttons or pegs 31.

It will be apparent, therefore, that any vapor generated in any of the cups 16 will pass up through one of the tubes 20 or 21 into the interior of the hood 28 from which it will escape only through the aperture 29'. Also, when the head of a user is inserted in the hood the face becomes in close relation to the aperture 29' so that the vapors are delivered directly against the face, which is the object of the beauty treatment.

The provision of separate heating units 17 and separate control switches 18 permits the selective heating of any one of the cups or any combination of the same.

The height of the aperture 29' may be varied by means of the telescoping joint between the shafts 11 and 12 of the pedestal, and the device may be turned for use in any position by means of the swivelled ball 13, or the like.

The object in the provision of the plurality of containers 16 and of the separate and selective controls and heating mechanism is to accomplish a beauty treatment consisting in applying to the face successive different vapors. Thus, in one of the containers 16 may be placed a substance which will give off a vapor having the property of opening the pores. This container may be heated first and when a suitable period of treatment with this vapor has elapsed one of the switches 18 may be operated to turn this container off so that no more vapor is produced.

A second container or cup 16 may contain a substance or mixture of substances whose vapor has some desirable feeding or other medicinal effect upon the skin. The effectiveness of this vapor will be greatly enhanced by the pretreatment given as above. This second container may be heated to give off its vapor for a desired period and then a switch operated to cut it out.

The third cup 16 may contain a substance which gives off a vapor having a toning or finishing effect on the skin. This last treatment is intended to finish off the operation. Its value is in large part dependent upon the two previous operations.

For particular sets of substances used in the treatment there will be a preferred period of exposure to the vapors of each of the containers. With the manually operated switches shown in the drawings the operator is responsible for the proper timing of the exposure. It is also possible to employ well known time switches in place of the manually opened and closed switches. In case the automatic time switches are employed the operator has merely to initiate the circuit closing and the switch will automatically open the circuit at the end of the period for which it is set.

The three treating substances are used in the same manner in the vaporizer. A 2½ ounce portion of each of the 3 substances is placed in its respective cup or container 16. This provides that 3 medicinally different vapors are obtainable in the hood by the separate and selective heating of the cups. The operation is to heat the cup containing the first substance and to continue the heating until the vapors have been applied for a period of 10 minutes to the face of users. The vapors produced by heating this substance will preferably have the effect, as above noted, of opening the pores and nourishing the skin. At the end of this 10 minute period a 1 minute rest period is allowed. Following the rest period the cup containing the second substance is heated so that its vapors are applied for a period of about 10 minutes. The effect of these vapors is preferably to clean the skin and remove blemishes. At the conclusion of this second application a further rest period of about 1 minute is allowed. Finally the cup containing the third substance is heated to apply the vapors from this volatile substance to the skin for a final period of 10 minutes. The final treating vapor preferably rejuvenates the muscles and the skin and closes the pores leaving the skin in a smooth condition.

It has been discovered that a series of the above treatments consisting of 15 treatments has a marked rejuvenating effect upon the skin. The treatments may be given daily or at other suitable intervals and of course the exact number may be varied to suit particular cases. It will likewise be seen that the times recited in the treatment, namely the 10 minute and 1 minute periods may be altered but these figures have been found to represent the preferred manner of administering the treatment.

When the vaporizer is constructed particularly for use with specific substances the heating elements 17 may be proportioned for the various cups according to the amount of heat desired to produce the proper vaporization of the substance contained therein. It is also intended that wherever electricity is unavailable or undesirable of use the heating may be accomplished by any other means, such as alcohol or oil burners.

In the modified form of device shown in Figures 3 to 5 the base 10 carries a fixed standard 11' into which is telescoped the movable sleeve 12' which is of slightly less diameter for this purpose. At the top of the fixed standard 11' is fixed an external ring 40 which is fastened to the standard 11'. Above the ring 40 and resting thereon is a loose ring 41 provided with a handle 42 by means of which it may be swung. The ring 41, as shown in Figure 5, has an internal diameter adapted to slip over the movable sleeve 12' and it has also a wall of varying thickness. Thus the ring is thicker at the point of attachment of the handle 42 than at the opposite side. The fixed ring 40 carries an arm 43 against which the outer surface of the ring 41 engages. Thus, by rotating the movable ring 41 pressure may be exerted upon the movable sleeve 12' to hold the same in any position of adjustment.

The upper end of the movable sleeve 12' is provided with an internally threaded socket 44 into which fits the externally threaded nipple 45 which is secured to the bottom 46 of the casing 47. The casing 47 is formed with substantially cylindrical side walls and a dome shaped top. The uppermost portion of the top is provided with an opening 48 which is internally threaded. Within the casing 47 is placed a modified vaporizing structure consisting in heating plates 49, which are of flat spiral structure. These heating plates 49 are three in number for the purpose of heating separately the three cups 16 as in the previously described form of the device. Each of the cups 16 is supported by a spring clip 50 which is attached to the heating plate 49 for the respective cup. As in the previously described form a set of tubes 20' and 21' fits into these cups and the tube 21' forms the common outlet for the vapors. As shown in Figure 4 the tube 21' is outwardly flared at its upper portion and fits very close to the casing 47 just below the aperture 48 so that the vapors are delivered to this aperture. The electric controls for the heating plates 49 are placed in a control box 51 which is attached to the bottom 46 of the casing 47. In this control box 51 are placed the three separate switches controlling the individual plates

49. The switches are preferably of the rheostat type in which there are low, high and medium adjustments. Current is supplied to the heaters from any suitable source through the cable 52.

In order to carry off the vapors which are delivered at the aperture 48, an elbow connector 53 is provided and has its lower end externally threaded to connect with the threads inside the aperture 48 and provide a vapor tight joint therewith. The upper end of the connector 53 is likewise externally threaded to connect with the vapor hood. In this form of the device the hood consists of a hollow sphere 54 provided at one side with a large aperture 55 into which the face of a user is to be inserted. At the opposite side of the sphere 54 is a smaller aperture 56 which is internally threaded to receive the elbow connector 53 and form a threaded connection therewith. A vapor directing plate 57 has a shank 58 of a diameter slightly less than the diameter of the connector 53 and is inserted into the upper end of the connector. It will be seen, as in Figure 4, that vapors arising through the connector 53 will be directed straight against the face of the user. In addition to this, the sphere 54 is provided with a cover 59 which is hingedly attached to the sphere to swing down and close the large aperture 55. This permits the device to be kept closed when not in use and likewise permits some amount of vapor to be accumulated in the sphere for immediate use as soon as the cover is lifted. Above the bottom 46 of the casing 47 and below the heating plates 49 is placed an asbestos, or other heat insulating, plate 60, the purpose of which is to prevent the bottom 46 from receiving the heat from the plates 49. As, when the device is used, the user will be sitting in an elevated chair with her knees in close proximity to the casing it is desirable to prevent the same from becoming too warm.

The casing 47 is provided with a hinged door 61 which is preferably transparent so that the operation within the vaporizing unit may be observed. Of course this door may be made to cover a much larger portion of the casing or other windows may be let into various parts of the casing.

It is obvious that various changes and modifications may be made in the details of construction and design of the above specifically described embodiment of this invention without departing from the spirit thereof, such changes and modifications being restricted only by the scope of the following claims:

What is claimed is:

1. A portable vaporizer for facial treatments comprising, an adjustable pedestal, three cups, said cups each to hold a different volatile medicament, means for mounting said cups on said pedestal, heating means for each of said cups for separate and selective volatilization of the different medicaments therein, three rigid tubes extending upwardly one from each of said cups and parallel one to another, the middle of said three rigid tubes having two oppositely disposed openings in the lateral walls, thereof, the other two of said three rigid tubes each being curved at the upper ends thereof and each curved end extending through one of said openings for snug engagement therein, and head receiving means connecting to the middle of said rigid tubes to direct the selected vapor against the face of a user.

2. A portable vaporizer for facial treatments comprising a pedestal, a plurality of cups, said cups each to hold a different volatile substance, means for mounting said cups on said pedestal, heating means for each of said cups for separate and selective volatilization of the different substances therein, rigid tubes extending upwardly from each of said cups and parallel one to another, one of said rigid tubes having openings in the lateral walls thereof, the remainder of said rigid tubes having their upper ends extending through the said openings for snug engagement therein, and head receiving means connected to one of said rigid tubes to direct the selected vapor against the face of a user.

3. A portable vaporizer for facial treatments comprising a stand, a plurality of cups mounted on said stand, said cups being adapted to receive each a different volatile medicament, a vapor collecting tube for each of said cups, face receiving means on the upper part of said stand for directing vapors upon the face of a user, said vapor collecting tubes being relatively short and interconnected, one of said tubes being connected to said face receiving means, and separate and individually controllable heating means for said cups whereby the different medicaments may be selectively volatilized and applied to the face of a user.

MARY PULGAR.